(12) United States Patent
Reimann

(10) Patent No.: US 12,730,231 B2
(45) Date of Patent: Sep. 8, 2026

(54) METHOD AND SYSTEM FOR SECOND NODE SUPPORTED AMBIGUITY DECISION

(71) Applicant: Lambda:4 Entwicklungen GmbH, Hamburg (DE)

(72) Inventor: Rönne Reimann, Hamburg (DE)

(73) Assignee: Lambda:4 Entwicklungen GmbH, Hamburg (DE)

(*) Notice: Subject to any disclaimer, the term of this patent is extended or adjusted under 35 U.S.C. 154(b) by 245 days.

(21) Appl. No.: 18/640,145

(22) Filed: Apr. 19, 2024

(65) Prior Publication Data

US 2024/0411032 A1 Dec. 12, 2024

(30) Foreign Application Priority Data

Jun. 6, 2023 (EP) .................................... 23177617

(51) Int. Cl.
*G01S 19/44* (2010.01)
*G01S 19/07* (2010.01)

(52) U.S. Cl.
CPC .............. *G01S 19/44* (2013.01); *G01S 19/07* (2013.01)

(58) Field of Classification Search
CPC .......... G01S 19/44; G01S 19/07; G01S 5/021; G01S 5/0278
See application file for complete search history.

(56) References Cited

U.S. PATENT DOCUMENTS 6,028,888 A 2/2000 Roux
8,659,474 B2 * 2/2014 Dai .......................... G01S 19/44 342/357.44
10,222,484 B2 * 3/2019 Dai .......................... G01S 19/32
10,884,133 B2 * 1/2021 Kim .......................... G01S 19/43
2009/0066572 A1 * 3/2009 Sugimoto ............... G01S 19/44 342/357.23

(Continued)

FOREIGN PATENT DOCUMENTS

CN 101057440 A 10/2007
CN 107171780 A 9/2017

(Continued)

OTHER PUBLICATIONS

Global Positioning System—Wikipedia.pdf (Year: 2022).*

*Primary Examiner* — Yonghong Li
(74) *Attorney, Agent, or Firm* — Sand, Sebolt & Wernow Co., LPA

(57) ABSTRACT

A method and system for eliminating ambiguity in phase measurements or phase relationships (integer ambiguity fixing). Such methods and systems are widely known from the prior art. An ambiguity search function is known from GPS, because the elimination of the phase ambiguities to an integer is crucial for achieving high accuracy with GPS, particularly with short measurement times. The method and system disclosed herein improve the decision-making to fix the phase ambiguity (integer ambiguity fixing). All receivers receiving the signal regardless of their location make the same decision and the decision is better or worse depending on the reception conditions. The reception conditions can be determined in particular by the received signal quality, amplitude and/or power. By using several receivers and their decisions it is therefore possible to make a better decision, which then applies to all receivers.

19 Claims, 1 Drawing Sheet

(56) References Cited

U.S. PATENT DOCUMENTS

2022/0326394 A1* 10/2022 Berntorp ................. G01S 19/44

FOREIGN PATENT DOCUMENTS

| | | | |
|---|---|---|---|
| CN | 112804178 | A | 5/2021 |
| CN | 113567979 | A | 10/2021 |
| EP | 2140285 | B1 | 7/2011 |
| EP | 3564707 | B1 | 3/2021 |
| WO | 2008024939 | A2 | 2/2008 |
| WO | 2012155990 | A1 | 11/2012 |
| WO | 2018052722 | A1 | 3/2018 |

* cited by examiner

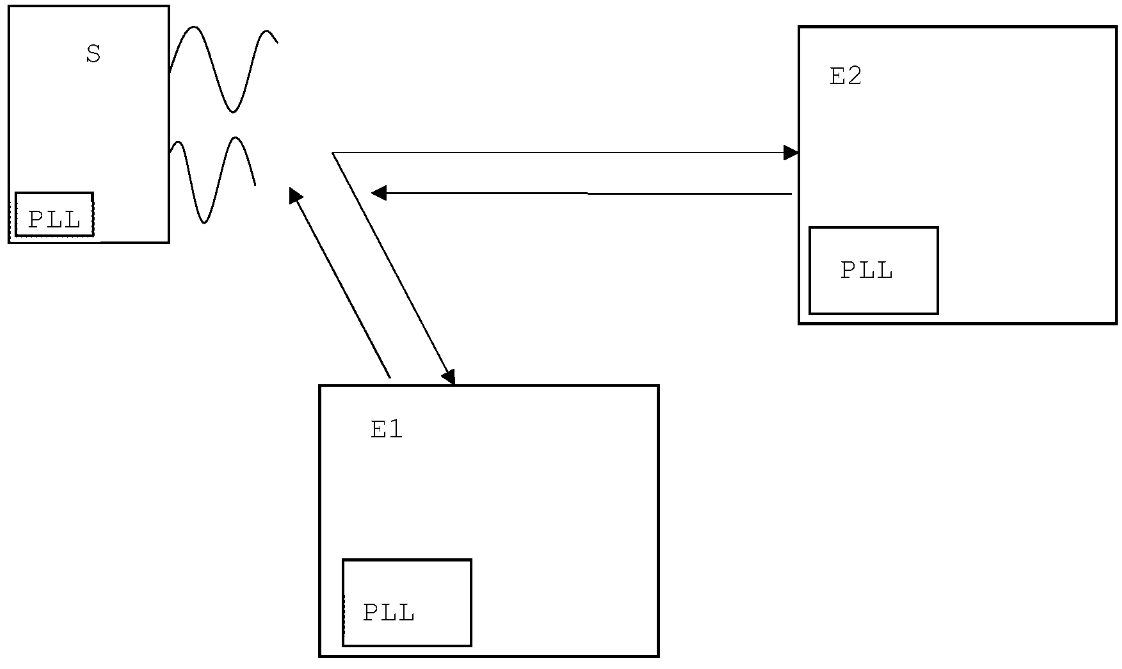
S
PLL
E2
PLL
E1
PLL

METHOD AND SYSTEM FOR SECOND NODE SUPPORTED AMBIGUITY DECISION

TECHNICAL FIELD

The invention relates to a method and system for eliminating ambiguity in phase measurements or phase relationships (integer ambiguity fixing). Such methods and systems are widely known from the prior art.

BACKGROUND ART

An ambiguity search function is known from GPS, because the elimination of phase ambiguities to an integer (integer ambiguity fixing) is crucial for achieving high accuracy with GPS, particularly with short measurement times. The most important methods for ambiguity fixing are the geometric method, the combination of carrier and code and the ambiguity search functions.

However, similar problems also exist with earth-based methods. For example, with radio-based methods for distance measurement that operate on a phase basis and use several signals, particularly at different frequencies, when the transmitter is not coherent, i.e. the phase relationship between two signals is not known, the problem arises at the receiver, particularly in order to determine the change in the phase shift caused by the frequency change due to the transmission. This is particularly the case when properties of the radio channel are to be analyzed based on signal round trips using mathematical methods, in particular with complex numbers, as known from EP 3 564 707 B1, for example.

In the prior art, a receiver is always used to make the decision. Various approaches are known with regard to the type of decision making, such as from EP 3 564 707 B1, WO 2018/052 722 A1, WO 2008/024939 A2, U.S. Pat. No. 6,028,888 A, EP 2 140 285 B1, CN 107171780 A, CN 101057440 A, CN 112804178 A and CN 113567979 A. Measures for optimizing the signal itself are also known, such as from U.S. Pat. No. 10,177,904 B2.

The transmission of measured values from several transceivers to an evaluation unit for calculating distances is known from WO 2012/155990 A1.

SUMMARY OF THE INVENTION

The inventor has recognized that this decision is the same for all receivers receiving the signal regardless of their location, for example the reflector (also designed as a transceiver for transmitting a response to an incoming radio signal), and that it is better or worse depending in particular on the reception conditions. The reception conditions can be determined in particular by the received signal quality, amplitude and/or power. By using several receivers, transceivers and/or round trips (defined by the locations of the partners performing the signal round trip, i.e. transceivers) and their decisions, it is therefore possible to make a better decision, which then applies to all receivers, transceivers and/or round trips that are based on the same output signal.

The object of the invention is therefore to improve the decision-making to fix the phase ambiguity (integer ambiguity fixing).

The object is achieved in particular by a method for improving the decision-making for eliminating the phase ambiguity (integer ambiguity fixing) between signals (output signals) of a transmitter, in particular a first transceiver, wherein an arrangement of a plurality of at least two, in particular at least three, nodes, for example radio receivers/transceivers, is used, wherein the nodes each have at least one antenna and in each case at least one frequency generator, in particular PLL, and are each configured to receive radio signals and to determine their, in particular relative, phase position and/or to respond thereto by means of a radio signal, and in particular are configured to communicate with one another and/or with a common central unit, said nodes having a distance from one another, in particular of more than one wavelength of one of the frequencies of the radio signal and/or more than 5 cm and/or less than 10 km, in particular less than 1 km, with at least one radio signal comprising at least two signals being emitted by means of the transmitter and the radio signal being received by the node, in particular all the nodes, and in particular with each of the at least two signals being answered, and the at least two nodes/the nodes which receive and/or answer the radio signal, in particular all of the nodes, each perform at least one phase measurement, in particular also an amplitude and/or power measurement, per signal, characterized in that a decision to fix the phase ambiguity is made for at least two signal round trips and/or at least two, in particular for each, node of the plurality of nodes, preferably at least two nodes, in particular all the nodes make such a decision, and a joint decision to fix the phase ambiguity is made by aggregation of the decisions to fix the phase ambiguity of/by means of the at least two, in particular each, node/signal round trip.

A signal round trip is defined in particular only by its end points, i.e. in particular the location of the transmitter/first transceiver and the location of the node.

The object is also achieved by a system comprising a plurality of nodes, the nodes each having at least one antenna and in each case at least one frequency generator, in particular PLL, and each being configured to receive radio signals and determine their phase position, and in particular being configured to communicate with one another and/or with a common central unit, in which the nodes have a distance from one another, in which the nodes are each configured to make at least one phase measurement per signal and/or to determine their, in particular relative, phase position, characterized in that the system is configured to make a decision to fix the phase ambiguity for at least two nodes and/or signal round trips by means of the nodes of the plurality of nodes and to make a joint decision to fix the phase ambiguity by aggregation of the decisions to fix the phase ambiguity of/by means of the at least two nodes.

The object is also achieved by using at least two decisions for eliminating the phase ambiguity for one radio receiver/signal round trip each, in particular (by means of) nodes/transceivers, in particular with respect to a radio signal received by both radio receivers, comprising at least two signals, for making a joint decision for eliminating the phase ambiguity by aggregating the decisions for eliminating the phase ambiguity of/by means of the at least two radio receivers.

Advantageous embodiments of the method also apply accordingly to the system and/or to its use. In particular, the system is configured to carry out the method according to the invention and/or the method and/or the use is carried out by means of a system according to the invention.

The radio signal can, for example, have two signals in succession, even with an interruption in between, each with a different frequency. The frequencies can be the same or, in particular, different. Even if the frequencies are the same, the phase relationship between the signals may be unknown when the frequency generator, in particular the PLL, is retuned, and a decision may therefore be required to fix the ambiguity. In particular, the frequencies are not more than 100 MHz apart, in particular not more than 10 MHz, and/or more than 0.5 MHz and/or in the range from 0.5 MHz to 2 MHz and/or span a range of at least 1 MHZ, in particular at least 2 MHZ, preferably at least 5 MHz. The time interval(s) is/are selected in particular such that the transmitter and receiver form a quasi-stationary arrangement during this time and/or the change in the phase shift caused by the change over the time interval is less than 30°, in particular with respect to at least two, in particular all, frequencies of the radio signal(s). Under these conditions, particularly reliable and accurate results can be achieved.

However, the radio signal can also have signals of different frequencies at the same time.

According to the invention, in particular at least two, in particular the totality, of the phase measurements on the at least two signals from different locations are thus used in particular to make a decision to fix the phase ambiguity and to make a joint decision to fix the phase ambiguity from this. Many systems use several nodes anyway, for example to enable positioning, to achieve better coverage and/or signal forwarding and/or to detect attacks. The method can be implemented particularly advantageously in such systems, as it does not require any additional equipment. In particular, it is not necessary to know the (relative) position of or distance between the radio receivers/nodes. A particular advantage of the invention also lies in the fact that a decision or the joint decision can be transmitted by means of just one bit and/or a decision with an indicator for the quality/weighting can be/is transmitted with a very small amount of data, for example one bit for the decision and two to seven, preferably up to five, bits for the quality and/or weighting, and that the system is preferably configured for this purpose.

The signals are generated in particular using a frequency generator, especially a PLL, of the transmitter.

In particular, the phase position of the signals relative to each other is determined. It is particularly advantageous if the nodes/radio receivers are each configured, and/or the method is carried out, in such a way that the phase relationship between frequency signals of their frequency generator is known. In particular, the frequency signals can be signals of different frequencies or signals between whose generation the frequency generator was switched off and/or generated frequency signals of a different frequency. This can also be achieved in different ways. For example, the phase relationship can be determined in the receiver, in particular measured, or the frequency generator can switch coherently between frequencies.

The nodes, which are designed in particular as radio receivers or transceivers, determine the phase position in particular to and/or in relation to their frequency generator, in particular PLL. In particular, all nodes/radio receivers attempt a phase measurement, but this may sometimes not be possible or may only be possible with great inaccuracy due to the reception conditions. However, this is precisely the strength of the invention, which makes it possible to make a reliable decision to fix the ambiguity even if the phase measurement at one or more of the nodes is not possible or only possible with a large error. This decision can then be used in turn for all phase measurements, radio receivers and/or nodes, with respect to the respective signal and/or signal pair.

The advantages of the invention become particularly clear if it is used in the context of further processing and/or analysis of the signals, for example to derive at least one property of the radio channel between transmitter and at least one receiver, and/or if a property of the one-way radio channel is to be derived from a signal round trip from the transmitter, which is then designed in particular as a (first) transceiver, to the receiver, which is then designed in particular as a (second) transceiver, and back to the transmitter, in which, for example, the receiver responds to the signal of the transmitter, i.e. from the transmitter to the receiver or vice versa, is to be derived and/or if the sum of the phase shift of the round trip is divided, in particular halved, for further processing and/or at least one, in particular complex, integer is derived from the phase shift of the round trip and a further measurement, for example of the received amplitude and/or power, by means of which at least one property of the one-way radio channel and/or distance and/or position, in particular relative, of the transceiver(s) involved in the signal round trip is preferably determined.

The aggregation is performed particularly advantageously using probability values and/or weightings of the decisions to fix the phase ambiguity of the at least two, in particular all, nodes and/or by averaging, selection and/or weighted averaging, in particular determining probability values and/or weightings on the basis of, in particular proportional to, reception energy, power, signal-to-noise ratio and/or signal quality of the signals received at the nodes. Ratios of one or more of these parameters to those of previous signals can also be used. Individual decisions can thereby also have very little or no influence on the joint decision due to very low probabilities, weightings and/or qualities.

The method is performed and/or repeated particularly advantageously for a plurality of signals, in particular at least 5, in particular at least 10 and/or up to 50, in particular with at least 5, in particular at least 10 and/or up to 50 different frequencies, and/or within a time span of up to 1 second and/or signals of a frequency hopping.

The joint decision is preferably used to fix the phase ambiguity when using the phase measurement of the, in particular of all the, nodes. This use may, for example, be one for determining a distance and/or position of the transmitter, one or all nodes and/or radio receivers, in particular relative distances between nodes and between one or more, in particular all, nodes/radio receivers.

The phase measurement is advantageously carried out on signals with different frequencies.

In particular, the nodes have a fixed and/or known spatial relationship to one another. This can be particularly advantageous if the method is used as part of a method for determining position and/or distance.

It is an advantage if the frequency generators of the nodes have a known phase relationship. This can be particularly advantageous if the method is used as part of a method for determining position and/or distance.

The method is used particularly advantageously as part of a method for phase-based distance and/or position determination of a transmitter relative to a node, in particular an arrangement of the nodes, and/or the signals are used for distance and/or position determination of a transmitter relative to a node, in particular an arrangement of the nodes.

The frequency generator of the transmitter is preferably not coherent between two frequencies and/or two activations. In this case, the method can make particularly good use of its advantages.

The nodes are advantageously part of a system that requires the nodes for another task anyway, for example as part of a motor vehicle, in particular cars or trucks and/or part of a system and/or device granting and/or preventing access.

The transmitter is advantageously a means of granting access, in particular a code, and/or the system has a transmitter configured to emit at least one radio signal comprising at least two signals.

BRIEF DESCRIPTION OF THE DRAWINGS

FIG. 1 shows an illustration of a transmitter S and two receivers E1 and E2 by way of example and purely schematically and not restrictively to explain certain aspects.

DETAILED DESCRIPTION

Using its PLL, the transmitter transmits two signals at different frequencies one after the other, illustrated by the two wavy lines. Between the transmissions, the PLL is switched to generate the second frequency. The phase relationship between the signals is thereby not known. For each of the signals, receiver E1 that is configured as a transceiver performs a signal round trip, and receiver E2 that is configured as a transceiver performs a signal round trip, although the invention can also be implemented without signal round trips. For this purpose, each of the receivers E1, E2 transmits a response signal for each signal (indicated only by a common arrow for each receiver) with the same frequency as the signal and measures the phase offset between the signal and the response signal.

The transmitter, also configured as a transceiver, also measures the phase offset between the signal and the response signal. The phase shift of the signal round trip caused by the transmission of the signal and response signal can be determined from this. The phase shifts, in particular the difference in phase shift between the two round trips, can then be used to determine the distance. However, in order to determine this, it is advantageous to determine the phase shift for only one of the directions, which can be assumed to be approximately half the phase shift of the signal round trip. During/after division by two, however, the ambiguity problem (in particular whether 180° is to be added/subtracted or the sign is to be changed) must be solved and a decision on the phase ambiguity of the divided phase shift with regard to the round trip Transmitter→Receiver E1→Transmitter and/or the round trip Transmitter→Receiver E2→Transmitter has to be taken. However, both decisions do not have to be taken or do not have to be taken independently of each other if they are both based on the same signal from the transmitter. For example, a decision taken regarding the round trip Transmitter→Receiver E1→Transmitter can also be used regarding the round trip Transmitter→Receiver E2→Transmitter. In particular when using a larger number of nodes/round trips, for example four, a joint decision derived from three round trips from the transmitter in each case via one of the receivers to the transmitter with the common signal of the transmitter can also be used with regard to the fourth, in particular with regard to all round trips.

What is claimed:

1. A method for improving decision-making on fixing integer ambiguity in phase-based measurements for or between signals of a transmitter(S) or for or between round trip signals based on the signals from the transmitter(S), the method comprising:

providing an arrangement of at least two nodes, said nodes each having at least one antenna and at least one frequency generator and each being configured to receive radio signals and to determine phases or relative phases of the radio signals, wherein the at least two nodes are configured to communicate with one another or with a common central unit and are arranged at a distance from one another;

transmitting at least one radio signal of the radio signals comprising at least two signals by the transmitter;

receiving the at least one radio signal by the at least two nodes;

performing at least one phase measurement per radio signal by each node of the at least two nodes;

taking at least two individual preliminary decisions for fixing the integer ambiguity comprising at least a first individual preliminary decision and a second individual preliminary decision, wherein i) the first individual preliminary decision is taken for the least one radio-signal being received at a first node of the least two nodes and the second individual preliminary decision is taken for the least one radio-signal being received at a second node of the least two nodes or ii) the first individual preliminary decision is taken for a first round trip signal based on the least one radio-signal and via the first node and the second individual preliminary decision is taken for a second round trip signal based on the least one radio-signal and via the second node; and taking a joint decision for fixing the integer ambiguity by aggregating the at least two preliminary decisions for fixing the integer ambiguity, said joint decision being applied for the at least one radio-signal being received at any node of the at least two nodes or for each round trip signal based on the at least one radio signal and via any node of the at least two nodes.

2. The method according to claim 1, wherein aggregating the at least two individual preliminary decisions is performed using probability values or weightings of the at least two individual preliminary decisions for fixing the integer ambiguity or by averaging weighted averaging of the at least two individual preliminary decisions based on reception energy, power, signal-to-noise ratio or signal quality of the at least two signals received at respective nodes.

3. The method according to claim 1, further comprising configuring the at least two nodes such that a phase relationship between frequency signals of the respective frequency generators of the at least two nodes are known.

4. The method according to claim 1, wherein the joint decision is used to fix the integer ambiguity when using the phase measurements of the of at least two nodes.

5. The method according to claim 1, wherein the at least two signals include signals at different frequencies, and wherein the at least two signals are transmitted with a time offset.

6. The method according to claim 1, wherein the phase measurements are carried out on the radio signals with different frequencies.

7. The method according to claim 1, wherein the at least two nodes have a fixed or known spatial relationship to each other or the frequency generators of the at least two nodes have a known phase relationship.

8. The method according to claim 1, wherein the method is used as part of a method for phase-based distance and/or position determination of the transmitter relative to a node of the at least two nodes or the radio signals are used: i) for distance or position determination of the transmitter relative to a node of the at least two nodes or ii) for analysis based on complex integers or iii) for the derivation of a property of a one-way channel from a signal round trip of the radio signals.

9. The method according to claim 1, wherein a frequency generator of the transmitter is not coherent between two frequencies or two activations.

10. The method according to claim 1, wherein the nodes of the at least two nodes are part of a motor vehicle or part of a system or device granting or preventing access.

11. The method according to claim 10, wherein the access is granted via the transmitter.

12. A system comprising:

at least two nodes, each node having at least one antenna and at least one frequency generator and each node being configured to receive radio signals and determine phases or relative phases of the radio signals;

wherein the at least two nodes are configured to communicate with one another or with a common central unit and are arranged at a distance form one another;

wherein each node of the at least two nodes is configured to make at least one phase measurement per radio signal of the radio signals;

wherein the system is configured to take at least two preliminary individual decisions for fixing integer ambiguity individually for signals received by either a first node or a second node of the at least two nodes or individually for round trip signals via either the first node or the second node of the at least two nodes; and wherein the system further is configured to take a joint decision for fixing the integer ambiguity for signals received at any node of the at least two nodes or for round trip signals via any node of the at least two nodes by aggregation of the at least two preliminary individual decisions for fixing the integer ambiguity.

13. The system according to claim 12, further comprising a transmitter configured to transmit at least one radio signal of the radio signals comprising at least two signals.

14. The system according to claim 13, wherein the at least two signals include signals at different frequencies and wherein the at least two signals are transmitted with a time offset.

15. The system according to claim 13, wherein the at least two nodes are part of a motor vehicle or part of a system or a device granting or preventing access.

16. The system according to claim 15, wherein the access is granted via the transmitter.

17. The system according to claim 12, wherein the aggregation is performed using probability values or weightings of the at least two preliminary individual decisions for fixing the integer ambiguity or by averaging or weighted averaging of the at least two individual preliminary decisions based on reception energy, power, signal-to-noise ratio or signal quality of the radio signals received at the at least two nodes.

18. The system according to claim 12, wherein the at least two nodes are configured such that a phase relationship between frequency signals of the frequency generators of the at least two nodes are known.

19. The system according to claim 12, wherein the joint decision is used for fixing the integer ambiguity when using phase measurements of the at least two nodes.

* * * * *